(12) United States Patent
Kuwahara

(10) Patent No.: US 8,792,576 B2
(45) Date of Patent: Jul. 29, 2014

(54) RADIO SIGNAL PROCESSING METHOD AND RADIO COMMUNICATION APPARATUS

(75) Inventor: Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 13/309,074

(22) Filed: Dec. 1, 2011

(65) Prior Publication Data

US 2012/0170623 A1     Jul. 5, 2012

(30) Foreign Application Priority Data

Dec. 3, 2010   (JP) ................................ 2010-269879

(51) Int. Cl.
*H04B 7/02*          (2006.01)
(52) U.S. Cl.
USPC .......................................... 375/267; 455/132
(58) Field of Classification Search
USPC ........................................................ 375/267
See application file for complete search history.

(56) References Cited

U.S. PATENT DOCUMENTS

| | | | | |
|---|---|---|---|---|
| 6,950,661 | B2 * | 9/2005 | Watanabe et al. | 455/456.1 |
| 7,751,381 | B2 * | 7/2010 | Kuwahara et al. | 370/342 |
| 8,406,145 | B2 * | 3/2013 | Kuwahara | 370/252 |
| 2007/0195738 | A1 * | 8/2007 | Kim | 370/335 |
| 2010/0034093 | A1 | 2/2010 | Roh | |
| 2010/0034146 | A1 * | 2/2010 | Hou et al. | 370/328 |
| 2010/0080315 | A1 * | 4/2010 | Yano et al. | 375/267 |
| 2011/0134775 | A1 * | 6/2011 | Khojastepour | 370/252 |
| 2012/0094702 | A1 * | 4/2012 | Furueda et al. | 455/501 |
| 2012/0250779 | A1 * | 10/2012 | Khojastepour | 375/267 |

FOREIGN PATENT DOCUMENTS

| | | |
|---|---|---|
| JP | 2006005791 A | 1/2006 |
| JP | 2008-278338 A | 11/2008 |
| JP | 2010-081482 A | 4/2010 |
| JP | 2010-514330 A | 4/2010 |

OTHER PUBLICATIONS

Multi-Antenna Radio Transmission Technique; NTT DoCoMo technical journal, vol. 14, No. 1; Apr. 2006; pp. 66-75.

* cited by examiner

*Primary Examiner* — Santiago Garcia
(74) *Attorney, Agent, or Firm* — Foley & Lardner LLP

(57) ABSTRACT

Disclosed is a radio communication apparatus for transmitting signals in the form of the MIMO comprises a reception signal processing unit for performing processing of signals received from a plurality of antennas, a transmission signal processing unit for performing processing of signals to be transmitted from the plurality of antennas, a control unit for controlling the whole of apparatus and a memory for storing a transmission/reception signal processing program and transmission/reception signal processing information. The reception signal processing unit corresponds to a plurality of kinds of reception signal processing schemes, and the control unit allots, in accordance with conditions of a radio communication apparatus opposing through propagation paths and with processing conditions in reception signal processing, one of the plurality of reception signal processing schemes as a reception signal processing method adapted to process signals received from the opposing radio communication apparatus.

6 Claims, 15 Drawing Sheets

RADIO SIGNAL PROCESSING METHOD AND RADIO COMMUNICATION APPARATUS

INCORPORATION BY REFERENCE

The present application claims priority from Japanese application JP2010-269879 filed on Dec. 3, 2010, the content of which is hereby incorporated by reference into this application.

BACKGROUND OF THE INVENTION

The present invention relates to radio communication technologies and more particularly, to a mobile radio communication technique for performing radio communications in which a radio apparatus performs radio communications by using a multi-antenna composed of a plurality of antennas.

In the field of mobile radio communication, a MIMO (Multi-Input Multi-output) system has been widespread in which both radio apparatuses adapted to perform transmission and reception of radio signals have each a plurality of antennas. In the MIMO system, transmission information is transmitted from the plural antennas and is then received by the plural antennas by way of a plurality of propagation paths (a multi-path). In the MIMO system, signals are multiplexed spatially and so, a plurality of pieces of different information are transmitted simultaneously at the same frequency, received by the plural antennas and then separated, so that highly efficient signal transmission can be achieved.

The signal reception processing in the MIMO system can be sorted into a process of decomposition of the MIMO for separating a plurality of coded signals from the multiplexed signal inputted to the reception antenna and a decoding process for returning each decomposed coded signal to information. As is known in the art, a MIMO channel reception process based on MLD (Maximum Likelihood Detection) and adapted to simultaneously perform the decomposition process and the decoding process can give optimum solutions. In the MLD, however, the quantity of operations increases exponentially in accordance with the number of states and the number of antennas and so, in present situation where resources of signal processing are limited, the MLD is difficult to be put into practice. The number of states referred to herein indicates the number of choices (varieties) capable of being taken. For a signal of 16 QAM (Quadrature Amplitude Modulation), for example, there are 16 kinds of choices. In the MLD, a method is taken according to which all choices are considered and a choice of the highest possibility of them is selected. Therefore, as the number of choices (states) increases, the quantity of operation increases correspondingly.

For the purpose of suppressing the operation quantity to realistic one, a MMSE (Minimum Mean Square Error) method has been known according to which the decoding process and the decomposition process of MIMO are carried out stepwise. The MMSE is superior to the MLD from the standpoint of smaller load imposed upon operation process but in a fading condition, the signal quality (SINR: Signal to Interference and Noise power Ratio) for obtaining an equivalent packet error rate is degraded by about 3 to 10 dB. Comparison of the MLD to the MMSE is explained in NTT DoCoMo technical journal Vol. 14, No. 1 entitled multi-antenna radio transmission technique (Non-patent Literature).

In the MIMO, a plurality of propagation paths is established virtually on space by using a plurality of antennas. One of the propagation paths established on space axis is called a stream. A code word is a name concerning a unit of information carried on the stream. One code word is generated by a single encoder. Two code words are generated by means of two encoders. For example, one code word generated with the encoder can be so decomposed as to be transmitted on two streams and this is called single code word transmission. A multi-code word transmission is also possible in which a plurality of code words generated by a plurality of encoders are transmitted from a plurality of antennas. In the multi-code word transmission, a plurality of users can each transmit code words with the help of a single encoder. This is called MU-MIMO (Multi-user MIMO). The code word has relation to the encoder (propagation path encoder) and error correction is applied in unit of code word. Accordingly, when two code words, for example, are transmitted, there is a possibility that one code can be corrected for error owing to the effect of error correction and can be received correctly but the other code word will fail to be corrected for error and cannot be received correctly.

SUMMARY OF THE INVENTION

The MLD can obtain characteristics of the MIMO having the performance optimum for reducing the packet error rate as described previously but encounters the problem that the operation quantity increases exponentially and imposes a large load upon signal processing. In recent years, the throughput required for the radio circuit has been increasing abruptly and so, concomitantly therewith, the signal processing quantity in the radio apparatus has also been increasing abruptly. Accordingly, provision of the MLD for the radio apparatus is difficult from the standpoint of the treating ability of the present-day hardware and software and the economy of the apparatus.

On the other hand, communication using a radio apparatus provided with the MMSE encounters a problem that in a high-speed mobile environment, for example, communication inside a train, satisfactory communication cannot be effected and although the MMSE uses less operation quantity so as to be superior in point of less processing load and of economy, its performance is unsatisfactory.

Further, with transmission power of a radio terminal being less than that of the base station in mind, there is a problem that in communication from the radio terminal to the base station, the base station is difficult to achieve reception with sufficient signal intensities. Furthermore, there arises a problem that an up-signal transmitted from the terminal does not arrive at the base station.

The present invention intends to solve the above problems and has for its object to enable a suitable signal processing method to be selected which considers conditions of a radio apparatus on the transmission side so as to perform suitable signal processing in compliance with the treating ability on the reception side when conducting transmission of radio signals on the basis of the MIMO. Another object of this invention is to realize processing of signals of high communication capacity economically.

To solve the above problems, a radio communication apparatus according to an embodiment of this invention comprises a reception signal processing unit adapted to process signals received from a plurality of antennas, a transmission signal processing unit adapted to process signals transmitted from the plurality of antennas, a control unit for controlling the whole of the apparatus, and a memory for storing a transmission/reception signal processing program and transmission/reception signal processing information, so that transmission of signals is carried out on the basis of the MIMO, wherein the reception signal processing unit operates correspondingly to a plurality of kinds of reception signal processing schemes and the control unit allots, in accordance with conditions of a radio communication apparatus opposing through transmission paths and processing conditions of the reception signal processing unit, one of the plurality of reception signal processing schemes as a reception method for processing signals received from the opposing radio communication apparatus.

According to the present invention, a suitable signal processing method in compliance with the treating capacity on the reception side can be selected while taking conditions of a radio apparatus on the transmission side into consideration. Further, signal processing having a high communication capacity can be materialized economically.

Other objects, features and advantages of the invention will become apparent from the following description of the embodiments of the invention taken in conjunction with the accompanying drawings.

DESCRIPTION OF THE EMBODIMENTS

Embodiment 1

In the field of radio communication, the MIMO (Multi-Input Multi-Output) using a plurality of antennas has been adopted. In the MIMO, different pieces of data are transmitted simultaneously from a plurality of transmission antennas, respectively, and these pieces of data are synthesized on space to provide signals which in turn are received by a plurality of reception antennas. The received signals are decomposed in a manner of solving an equation and original streams are reproduced. Known as a method for solving the MIMO is a MMSE (Minimum Mean Square Error) method in which space separation is first carried out by using a presumed channel matrix and then a LLR (Log Likelihood Ratio) is determined. Also, a method of executing the space separation and the likelihood ratio calculation in combination simultaneously, called a MLD (Most Likelihood) method, has been known as introducing an optimum solution.

As is known, in the MLD, however, a metric calculation (calculation of a distance between a reception dot and a replica, that is, calculation relating to the likelihood of a candidate for transmission code) must be carried out for all replicas and when the number of candidates for replica is large as in the case of an increase in the number of antennas or of 64 QAM, the quantity of operations increases in a factorial fashion. With a view to solving the problem involved in the operation quantity, a method called QR decomposition-MLD has been known.

In the QR decomposition-MLD method, by executing QR decomposition of a channel matrix, the channel matrix is caused to turn into an upper triangular matrix and by using this partial matrix, the likelihood is calculated and candidate dots for replicas are ranked from the results of likelihood calculation to thereby restrict the candidate dots for replicas. This type of method is noticed as a method which can suppress performance degradation while reducing the calculation quantity to great extents especially when the number of antennas increases.

In the following, the present invention will be described by way of example of a system of FDD (Frequency Division Duplex) but advantageous effects of the present invention will remain unchanged even in a system of TDD.

(Construction of Overall Apparatus)

Figure 1:
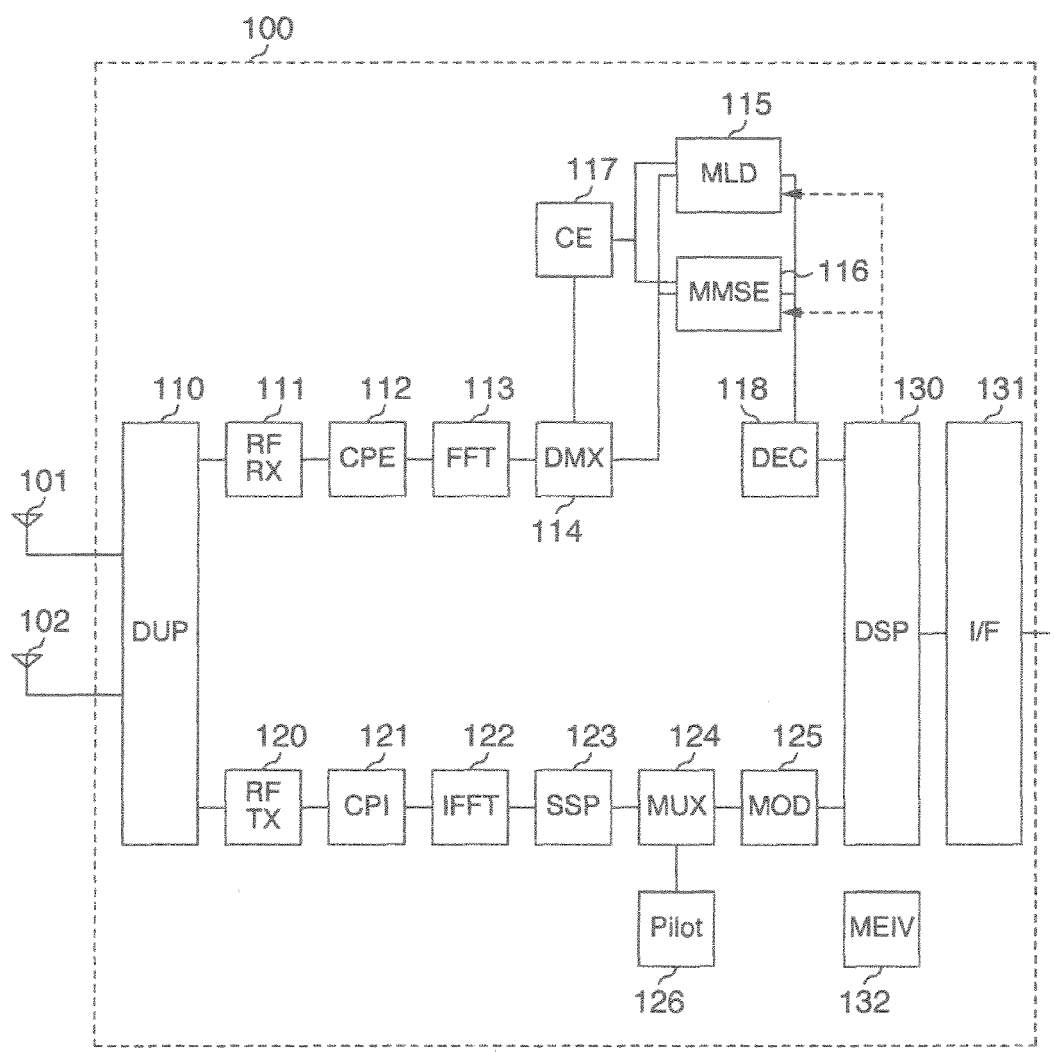
FIG. 1 is a block diagram useful to explain the construction of an apparatus according to an embodiment of the present invention.

Referring now to FIG. 1, the construction of an apparatus in a first embodiment of the present invention will be described.

Illustrated in a block diagram of FIG. 1 is an apparatus 100 carrying out the present invention. Signals transmitted from a transmitter not shown are received by two antennas 101 and 102. The received signals are sent to the reception side within the apparatus with the help of a duplexer 110. In a RF (Radio Frequency) circuit 111 on the reception side, the received signals undergo necessary processing such as down conversion and thereafter, they are converted into digital signals. The converted digital signal is removed of a CP (Cyclic Prefix) at a CP eliminator 112. The CP is an OFDM (Orthogonal Frequency Division Multiplexing) signal which is inserted for the sake of improving the multi-path performance. Subsequently, the digital signal is converted from the time domain to the frequency domain by means of a FFT (Fast Fourier Transform) circuit 113 and separated to signals of individual sub-carriers. The signals thus separated to the individual sub-carrier signals are separated by means of a demultiplexer 114 to, for example, pilot signals in compliance with different functions. Propagation paths of the thus separated pilot signals are presumed by means of a channel estimator 117, thereby generating a channel matrix. By using the results of the generated channel matrix, the demultiplexer 114 applies a MLD process 115 or MMSE process 116 to pieces of symbol information of separated data traffics so as to obtain log likelihood ratios (LLR's). Which one of the MLD process 115 and MMSE process 116 is to be selected is designated by a DSP (Digital Signal Processor) 130 on the basis of algorithm of the present invention to be described later. The thus obtained log likelihood ratios are accumulated in an accumulation means 132 such as a memory and thereafter inputted to a decoder 118. The decoder 118 solves error correction such as TURBO code from the inputted LLR's and outputs a likelihood restoration signal which is the most probable. In this phase, an interpolated CRC (Cyclic Redundancy Check) code is checked to check whether the decoding is executed correctly. If correctly decoded, the decoded signal is subjected to an upper process such as MAC (Media Access Control) by way of the DSP 130 and thereafter, transferred to a network or an upper layer via an interface 131. If not decoded correctly, a failure in decoding is reported to the DSP and so, the upper retransmission function such as HARQ (Hybrid Automatic Request and Repeat) operates.

Figure 3:
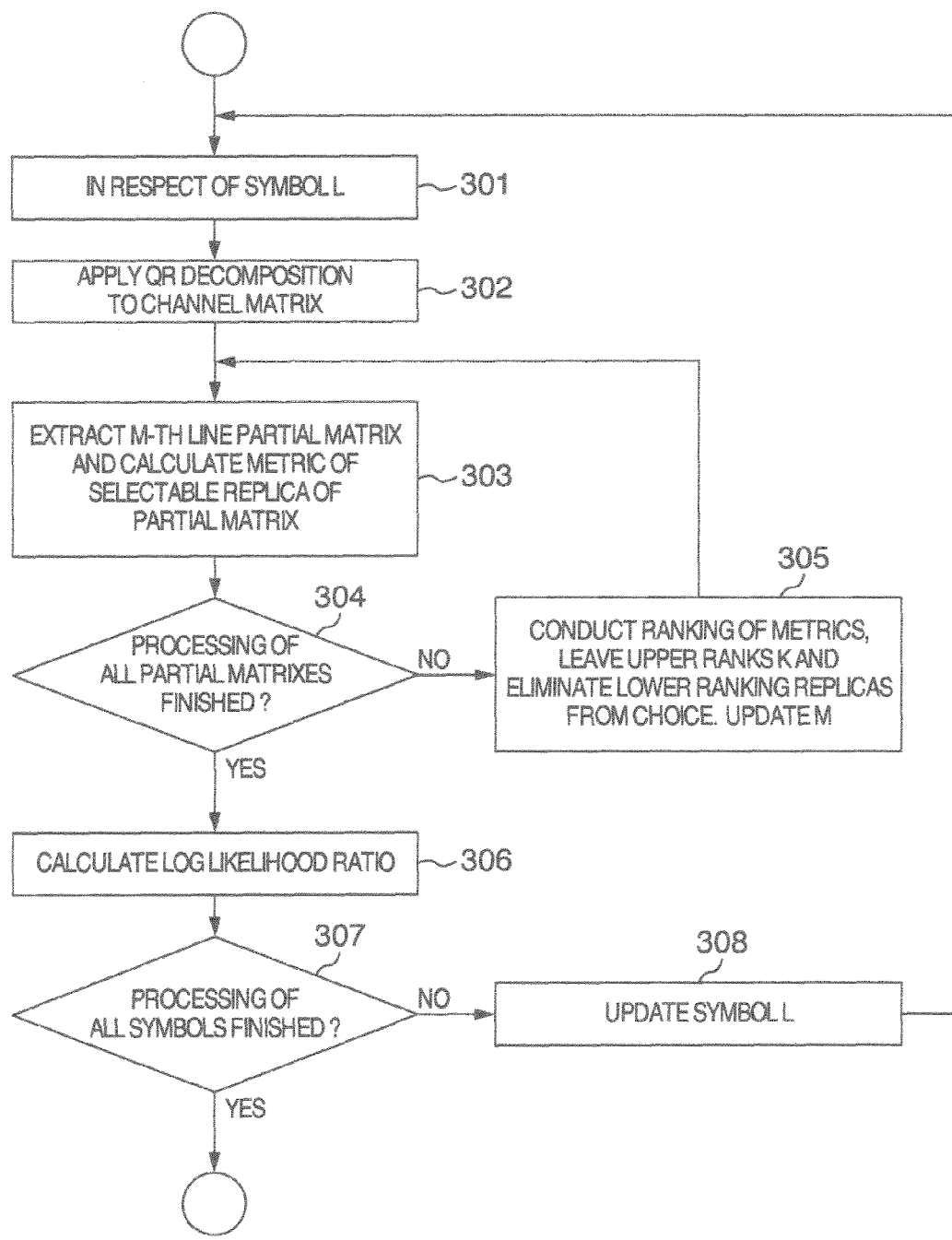
FIG. 3 is a flowchart for explaining MLD processing.

Illustrated in FIG. 3 is a flowchart for explaining the contents of processing by the MLD.

The flow of MLD processing shown in FIG. 3 is incorporated in the MLD process 115 in FIG. 1. As an embodiment, either hardware processing by means of an ASIC (Application Specific Integrated Circuit) or based on a FPGA (Field-Programmable Gate Array) can be practiced or software processing by means of the DSP can be practiced.

Figure 4:
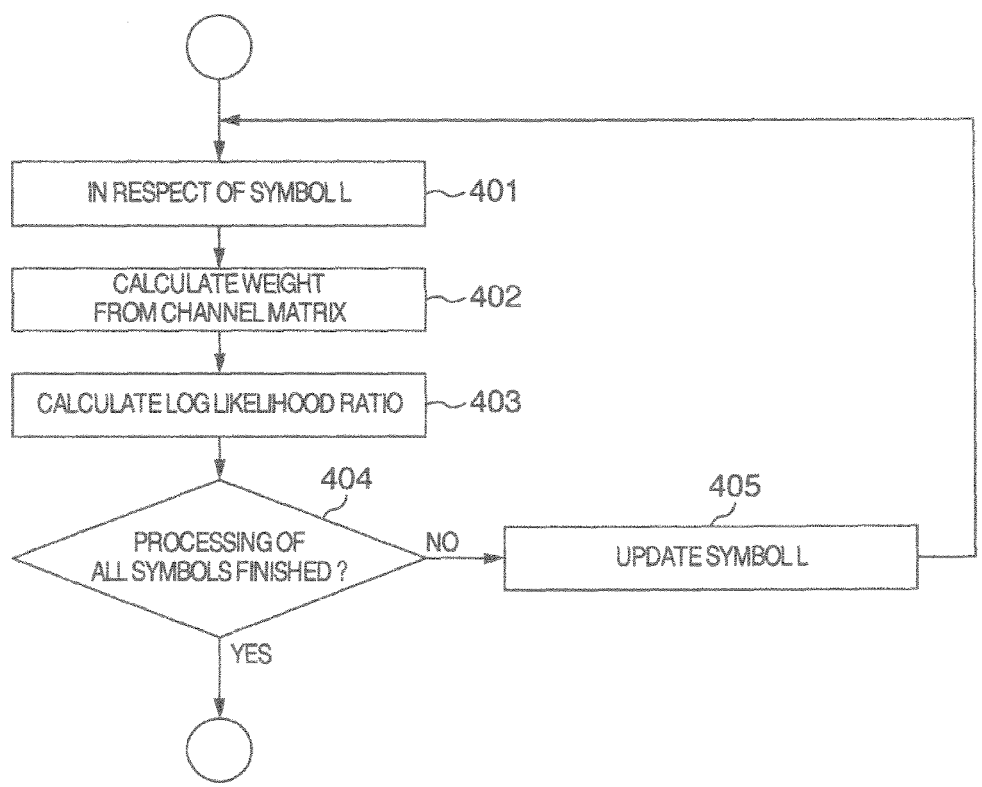
FIG. 4 is a flowchart for explaining MMSE processing.

FIG. 4 shows a flowchart for explaining the contents of the MMSE process.

In the MMSE processing indicated with reference to FIG. 4 is incorporated in the MMSE process 116 in FIG. 1. As an embodiment, like the MLD process, either hardware processing by means of the ASIC or based on FPGA can be practiced or software processing by means of the DSP can be practiced.

In FIG. 1, functional blocks 120 to 126 are on the transmission side and paired with those on the reception side. When executing the previously described HARQ, a NACK (Negative Acknowledgement) signal indicative of a failure in data reception is created through these blocks and transmitted to an opposing transmitter.

Figure 2:
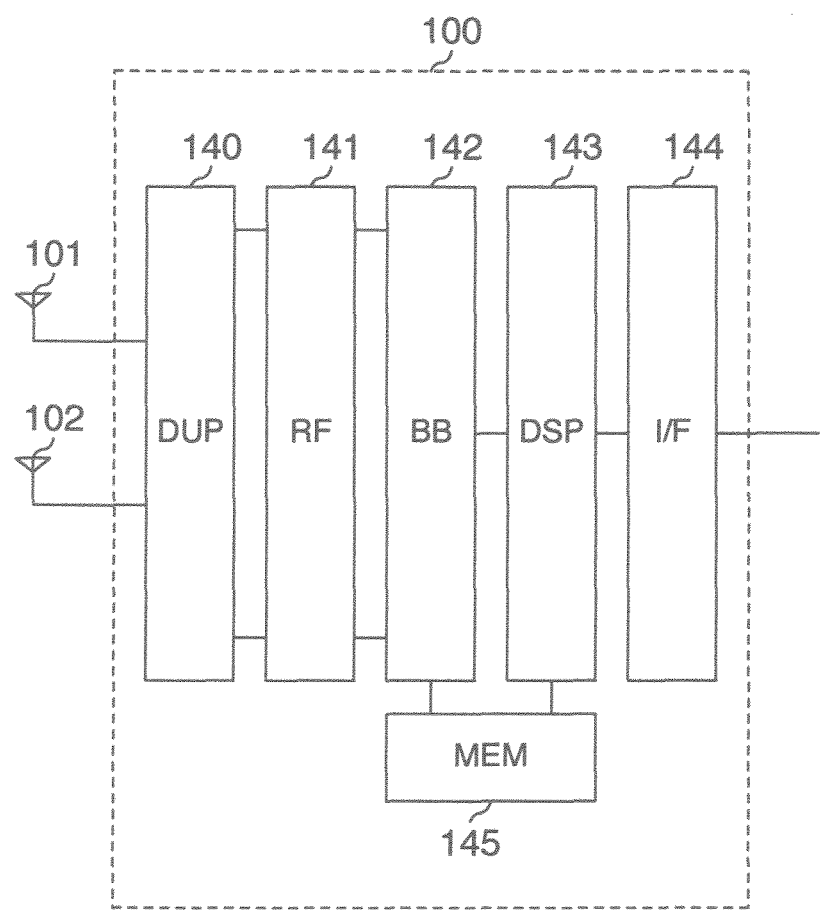
FIG. 2 is a diagram illustrating the construction of the apparatus in the embodiment of the invention in terms of device image.

Turning to FIG. 2, an example of the apparatus of the present invention diagrammatically drawn by taking in awareness of devices is illustrated.

The apparatus carrying out the invention is illustrated in FIG. 2 in block form of chip level by taking in awareness of devices. Signals received by antennas 101 and 102 are separated to up and down frequencies through a duplexer 140 and inputted to an RF chip 141. Inside the RF chip, the reception signal is amplified by means of an amplifier not shown and its frequency is converted by a mixer not shown to a frequency of a base band signal. Further, through AD conversion, the resulting signal is converted into a digital signal. In a base band chip 142 succeeding the RF chip, a demodulation/decoding process is carried out and transmitted information is presumed. A DSP chip 143 is adapted to manage the overall apparatus and to deal with the upper layer. The reception side is connected through an I/F 144 to the network in the case of a base station but in the case of a terminal, to the upper layer such as application. If checking the presumed decoding results for error is not problematic, the reception side transmits received information to the upper layer or to the network via the I/F. Both the MLD process and the MMSE process the present invention discloses are packaged in the base band chip 142. Also, a program for selecting the MLD or the MMSE according to the algorithm by the present invention is packaged in the DSP 143. In addition, the program and the processing information are stored in the memory 145.

(QR Decomposition-MLD)

Flow of QR decomposition-MLD will be explained by making reference to FIG. 3 and FIGS. 5 to 18. FIG. 3 shows flow of operation of QR decomposition-MLD. For better understanding of explanation, 2×2 MIMO's are described as an example but the invention is not limited to this category and also exhibits the same advantageous effects in the case of N×N MIMO's.

(Step 301)

In FIG. 3, a reception signal series consisting of a plurality of symbols is first decomposed to individual symbols. The symbol referred to herein means a minimum unit of transmission information constituted by 1 OFDM symbol×1 subcarrier in the case of OFDM. In the case of SISO (Single-Input Single-Output), the transmission information is transmitted from a single antenna and therefore, transmission information of 1 symbol is expressed by a single code having a constellation of either QPSK (Quadrature Phase Shift Keying) or 16 QAM. For 2×2 MIMO (in the case of QPSK), different pieces of information are transmitted at a time from two antennas and therefore, transmission information of one symbol consists of two codes having two constellations S1 and S2, respectively, as exemplified in FIG. 5. The wording "constellation" originally shows an "asterism", and referred to herein signifies an arrangement of codes on phase space (or IQ plane) in the code theory.

Figure 5:
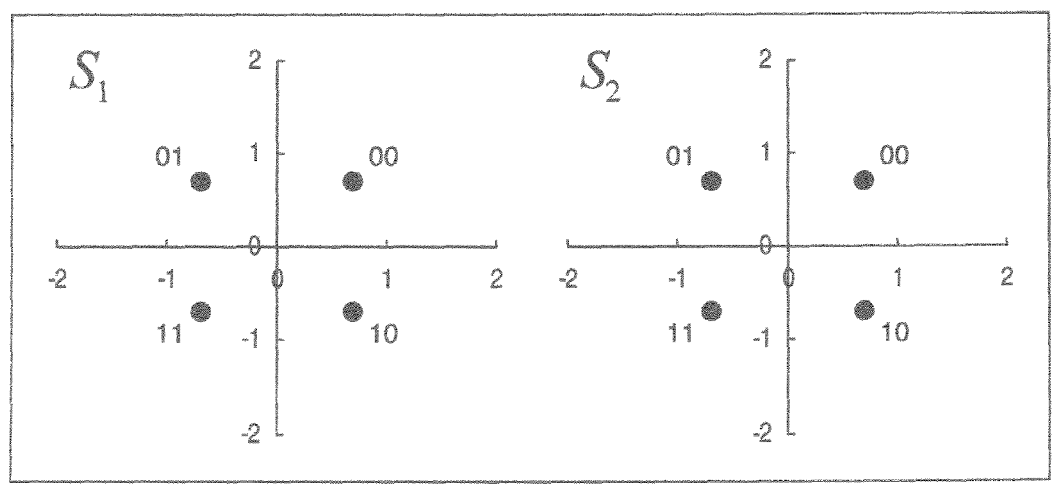
FIG. 5 is a diagram illustrating an example of constellation during transmission of QPSK (Quadrature Phase Shift Keying) of 2×2 MIMO.

Illustrated in FIG. 5 is an example of constellation of 2×2 MIMO when the QPSK is used as modulation scheme.

In FIG. 5, four code dots are indicated in respect of each antenna. With the QPSK used, the number of bits of one symbol is 2 bits. Each of the 4 code dots can transmit information of 2 bits and each of the 4 dots indicates pieces of 2-bits information "00", "01", "11" and "10", respectively.

Figure 6:
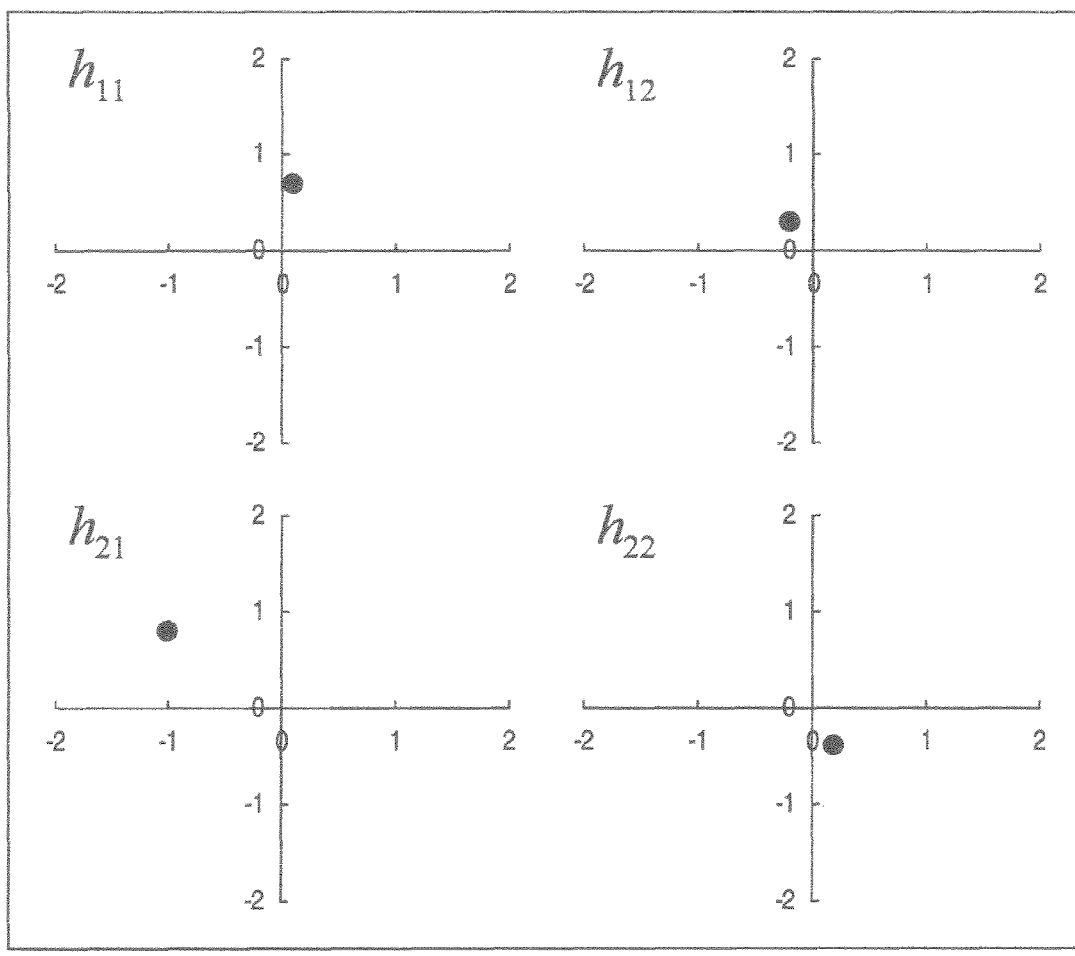
FIG. 6 is a diagram illustrating an example of a channel matrix of 2×2 MIMO.

FIG. 6 illustrates an example of a channel matrix for the 2×2 MIMO.

Figure 7:
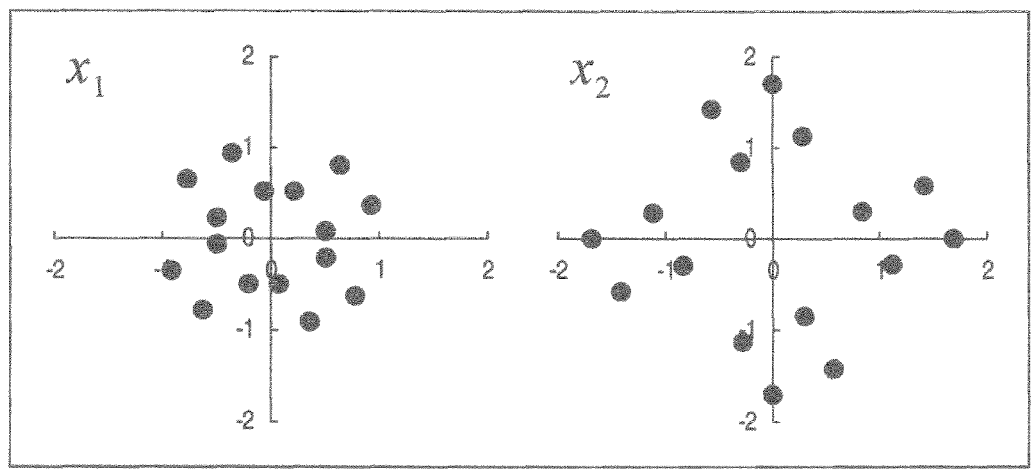
FIG. 7 is a diagram illustrating an example of a QPSK reception signal of 2×2 MIMO.

Illustrated in FIG. 7 is an example of a QPSK reception signal of 2×2 MIMO.

Individual transmitted codes (signals) propagate through propagation paths (for example, those represented by the channel matrix shown in FIG. 6), respectively, and two transmission codes (signals) are synthesized and received by the receiving antennas. In FIG. 6, the response of propagation path is indicated by a vector connecting the origin and a dot ●. Since the transmission signals are synthesized after being weighted by the propagation paths, they are received in the form of signal dots as shown in FIG. 7. Each of the four dots of the transmission code can also be defined as a vector and "weighting" can be understood as a vector product for multiplying the transmission code (vector) by the propagation path (vector).

The description will be given hereunder in greater detail.

Codes transmitted from two antennas in 2×2 MIMO are indicated by the sum of 4 dots expressed by a vector product of $h11×s1$ and 4 dots expressed by a vector product of $h12×s2$. Consequently, in the antennas on the reception side, the signals are received in the form of 16 signal dots corresponding to a combination of 4 dots×4 dots. The signal dots on the reception side are illustrated in FIG. 7. With the 2 reception antennas, signals propagating through 4 independent propagation paths, respectively, are received and therefore, two kinds of constellations having each candidates of 16 dots can be obtained. In the MIMO, reception of the signals is treated in such a manner that the transmission signals are presumed by solving an equation.

In FIG. 7, with a view to making the concept of reception process comprehensible, the signals are plotted without introducing the receiver noise and the influence of interference. This type of reception dot without consideration of the influence of noise will hereinafter be called a presumed reception dot (replica). An actual reception dot is affected by noise and the like and accordingly, it is distant from the aforementioned presumed reception dot.

The actual reception dot can be expressed pursuant to expression (1)

$$X = \begin{bmatrix} x_1 \\ x_2 \end{bmatrix} = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} = HS + N \quad (1)$$

where x represents a reception signal and s represents a transmission signal, and h means a channel indicative of a propagation path and n means noise power.

Since the receiver receives signals with the help of two antennas, the signal is expressed by a vector of two elements. Since the transmitter transmits signals also with the help of two antennas, the signal is expressed by a vector of two elements. The propagation path h consists of 4 paths from 2 antennas to 2 antennas and is therefore expressed in the form of a 2×2 matrix. Since thermal noise of the receiver is principally responsible for the noise, the noise is expressed in the form of a vector added to each of the two antennas of receiver. In order to create a presumed reception dot, the aforementioned propagation path h needs to be presumed. To this end, the transmitter transmits a signal in which a pilot signal representing known information is embedded in a suitable symbol. On the reception side, the pilot signal is detected to presume the propagation path. Even for time and frequency without accompanied by any pilot, the results of the propagation path presumption executed with the help of the symbol embedded with a pilot signal are applied to interpolative operation to presume a propagation path. As a result, a channel matrix indicated by H in expression (1) can be presumed.
(Step 302)

In step 302 of FIG. 3, the channel matrix is subjected to QR decomposition so as to be caused to turn into an upper triangular matrix. After the QR decomposition, expression (2) stands.

$$Y = GX = \begin{bmatrix} y_1 \\ y_2 \end{bmatrix} = \begin{bmatrix} r_{11} & r_{12} \\ 0 & r_{22} \end{bmatrix} \begin{bmatrix} s_1 \\ s_2 \end{bmatrix} + \begin{bmatrix} \tilde{n}_1 \\ \tilde{n}_2 \end{bmatrix} = RS + GN \quad (2)$$

When calling terms in expression (2) in succession starting from the leftmost to called a first term, a vector Y in the first term represents a converted reception signal. The conversion expression is the second term and is obtained by multiplying a vector X of reception signal by a conversion matrix G. Here, G is a conversion operator for realizing conversion to an upper triangular matrix. The operator is not limited to single one but various operators can be conceivable. For example, a Givens rotary matrix is known as one of conversion operators for realizing the upper triangular matrix. The fourth term indicates that H is converted to R by the operator G. Here, R is characteristic of the fact that, in expression (2), the left element $r_{21}$ is 0. The terminology of the conversion to upper triangular matrix originates from this format.

$$G = \frac{1}{\sqrt{|h_{11}|^2 + |h_{21}|^2}} \begin{bmatrix} h_{11}^* & h_{21}^* \\ -h_{21} & h_{11} \end{bmatrix} \quad (3)$$

By using expression (3), R=GH is expressed by expression (4).

$$R = \begin{bmatrix} r_{11} & r_{12} \\ 0 & r_{22} \end{bmatrix} = \frac{1}{\sqrt{|h_{00}|^2 + |h_{01}|^2}} \begin{bmatrix} |h_{00}|^2 + |h_{01}|^2 & h_{00}^* h_{10} + h_{01}^* h_{11} \\ 0 & h_{00} h_{11} - h_{01} h_{10} \end{bmatrix} \quad (4)$$

In this step 302, by using expression (3) operation is executed for determining in expression (2) and R in expression (4).
(Step 303)

The program proceeds to step 303 in FIG. 3. Expression (2) can be interpreted as an expression composed of two of upper and lower equations. Firstly, the lower second equation can be given by expression (5).

$$y_2 = r_{22}s_2 + \tilde{n}_2 \quad (5)$$

In the second equation, a term concerning s1 is deleted by conversion to the upper triangular matrix. Accordingly, in its constellation, dots are concentrated to 4 dots as shown at ● in FIG. 9. Presupposing candidates R2 for s2 (in the case of QPSK, R2 is any one of ⌈00⌋ ⌈01⌋ ⌈11⌋ ⌈10⌋ as shown at s2 in FIG. 5), the metric is expressed by expression (6).

$$L(R_2) = \frac{|r_{22}R_2 - y_2|^2}{|\tilde{n}_2|^2} \quad (6)$$

This expression is calculated in respect of all of the candidates.
(Step 304)

The program proceeds to step 304 in FIG. 3. In this step, processing concerning all of the partial matrixes in expression (2) is checked for its completion. Throughout the processing so far, the processing concerning expression (5) has been completed but processing concerning the first equation, as expressed by expression (7), has not yet been finished and so, the program proceeds to step 305.

$$y_1 = r_{11}s_1 + r_{12}s_2 + \tilde{n}_1 \quad (7)$$

(Step 305)

the program proceeds to step 305 in FIG. 3. In this step, the metrics concerning all of the candidates calculated in the step 303 are ranked in order of smaller to larger ones of expression (6) (in order of higher to lower levels of likelihood). The first ranking corresponds to the minimum metric of expression (6). In ranking, candidates for upper K metrics are left and the other candidates are determined as impossible and excluded.

Figure 8:
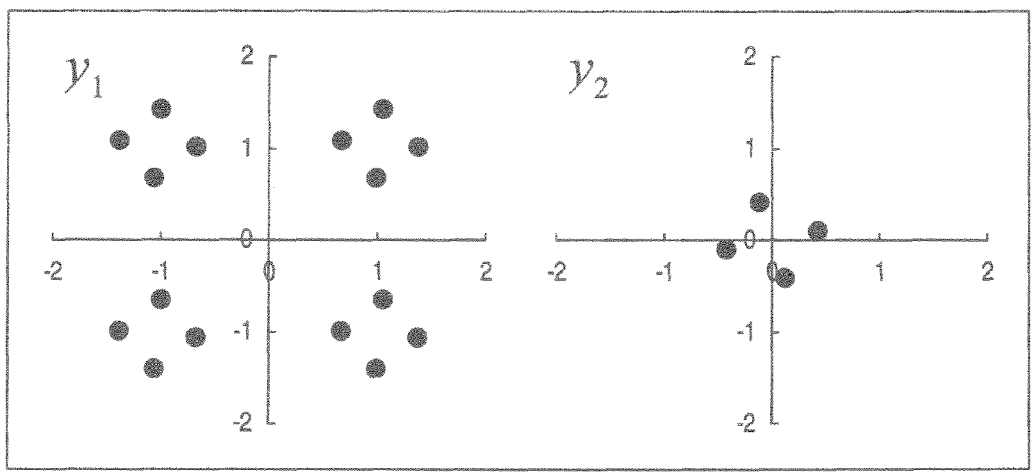
FIG. 8 is a diagram illustrating an example of a reception signal after QR decomposition of 2×2 MIMO.

Referring to FIG. 8, reception signals after QR decomposition, that is, values of Y are plotted.

As will be seen, y2 affected by only s2 is degenerated to 4 dots. Under the condition of this degeneration, the number of candidates for s2 is constricted to a predetermined value. A method for constriction is referenced to metrics. The metric has relation to the distance between the presumed reception dot and the actual reception dot, leading to making the use of the fact that the remoter the distance, the larger the metric value becomes. In other words, candidates for ranks up to the range of upper K ranks corresponding to smaller metric values are left.

Figure 9:
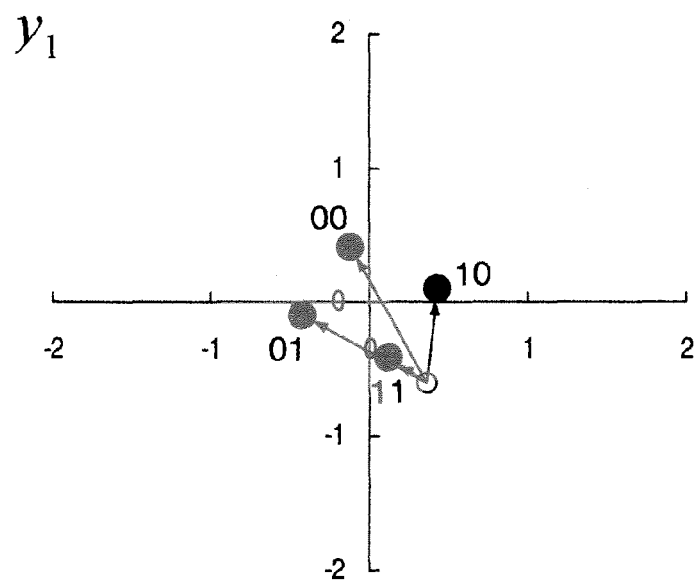
FIG. 9 is a diagram illustrating an example of presumed reception dot and actual reception dots pursuant to expression (2).

Illustrated in FIG. 9 is an example of presumed reception dots and an actual reception dot in connection with expression (2).

Presumed reception dots (black dots: 4 dots) obtained from the channel matrix and replica (candidate point R2 for s2 shown in FIG. 5) and the actual reception dot (white dot: 1 dot) are illustrated. Since the actual reception dot is affected by noise and interference, it is shifted from that in the constellation in. FIG. 8. This reception dot is affected by noise but if the noises comply with the Gaussian distribution, a presumed reception dot which is the most closely distant from the actual reception dot is considered to have the highest likelihood and has the minimum metric value.

In FIG. 9, the dot (11) at the closet point has the likelihood and so, the smallest metric value. Conversely, (00), (10) and (01) have large metrics and they can be judged as probably nonexistent dots. Accordingly, if K=1, is set, for instance, (11) is selected and (00), (10) and (01) are excluded from candidates. After the selection, M is updated to enable processing concerning expression (7) to be carried out.
(Step 303-2)

The program returns to the step 303 (second occurrence). In this step, out of the upper and lower two equations in expression (2), a process concerning the upper first equation (expression (7)) is carried out. In expression (7), contribution by s1 and s2 has the influence upon y1. When candidates for s1 and s2 are assumed to be R1 and R2, the likelihood is given by expression (8).

$$L(R_1, R_2) = \frac{|r_{11}R_1 + r_{12}R_2 - y_1|^2}{|\tilde{n}_1|^2} + \frac{|r_{22}R_2 - y_2|^2}{|\tilde{n}_2|^2} \quad (8)$$

However, it should be understood that candidates for R2 are restricted in step 305. If R2 is restricted to (11) alone, the candidate for R2 is only one and therefore, (R1, R2) is set up in only 4 combinations and the calculation quantity can be reduced to ¼.

Figure 10:
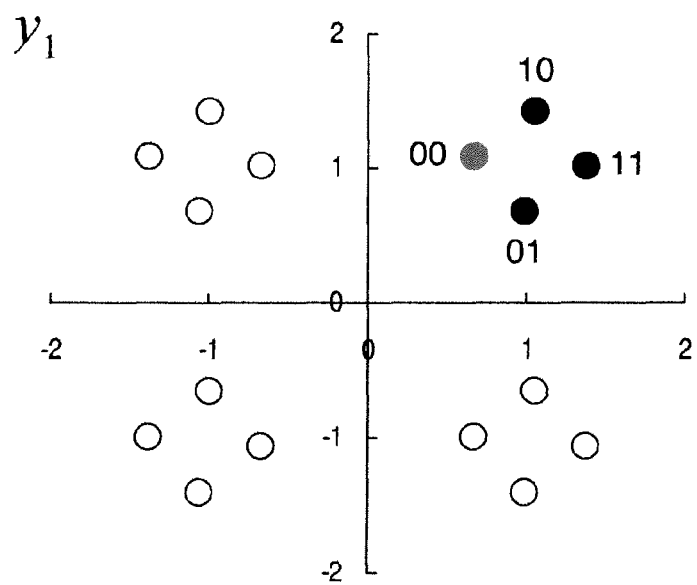
FIG. 10 is a diagram for explaining a reduction in the number of candidates for presumed reception dot by restriction.

FIG. 10 is useful to explain the fact that the number of candidates for presumed reception dots in expression (1) is reduced by the restriction.

In FIG. 10, presumed reception dots obtained from the channel matrix and the replica (candidate dot R2 for s2 shown in FIG. 14) are illustrated. Candidates for (R1, R2) are 16 dots indicated by white dots and black dots but R2 has been restricted to (11) in advance and so, 4 dots indicated by black dots are candidates for (R1, R2).
(Step 304-2)

The program proceeds to step 304 in FIG. 3. In this step, processing concerning all partial matrixes in expression (2) is checked for its completion. Since in the processing so far, processing concerning expression (5) and expression (7) has ended and processing concerning all partial matrixes are completed, the program proceeds to step 306.
(Step 306)

The program proceeds to step 306 in FIG. 3. In this step, a log likelihood ratio (LLR) is calculated from the obtained metric values. In the example in FIG. 5, since QPSK symbols each capable of transmitting information of 2 bits are transmitted simultaneously from the two antennas, information of 4 bits in total can be transmitted at a time. A log likelihood ratio for each bit is determined through the following procedures. More particularly, each of the 4 bits is noticed and probability P0 when the transmitter is assumed to transmit 0 is calculated. Also, probability P1 is calculated when the transmitter is assumed to transmit 1. Then, a ratio between these probabilities is taken and its logarithm is further taken, thus calculating log (P0/P1).

Here, it is meant by noticing each bit that if transmission information (s1, s2) is divided into bit information and is expressed by such 4 bits as ((b0, 1), (b2, b3)), one bit of them is noticed. For example, when only the bit of b0 is noticed, 8 combinations of other bits (b1, b2, b3) are all noticed and probabilities of P0 and P1 are calculated. But calculation of probabilities of all of the 8 combinations is laborious and accordingly, as a method for reducing the calculation quantity, MAX log MAP approximation has been well known. In this method, contrast to taking all of the 8 combinations essentially, only a combination in which the metric is minimized is selected and P0 or P1 is approximated by the probability based on the bit combination.

On the assumption that the noises comply with the Gaussian distribution, the probability is expressed by $\exp(-x^2)$. In this expression, a base of $x^2$ corresponds to the metrics calculated so far. Accordingly, the likelihood ratio is advantageous in that not only P0/P1 is merely replaced by the difference $\log(P0)-\log(P1)$ through logarithmic calculation but also the operation of exponent necessary for calculation of P0 or P1 can be eliminated. In short, if, in noticing a certain bit, the bit is assumed to be 0 or 1, then by making use of the fact that when all combinations of the other bits are considered and a combination for which the metric is minimized is selected and besides, the metric becomes log(P0) or log(P1), the LLR is obtained by calculating the difference between log(P0) and log(P1). The above operation is conducted for all of the 4 bits.

Four LLR's corresponding to the obtained 4 bits are real numbers taking positive and negative values. This means that if a positive value is taken, this gives an index for indicating that information is considered to have higher probability of transmission in 0 and it is meant, therefore, that as the positive value becomes larger, the transmission information being 0 becomes more probable. Conversely, if a negative value is taken, this gives an index for indicating that information is considered to have higher probability of transmission in 1 and it is meant, therefore, that as the negative value becomes smaller, the transmission information being 1 becomes more probable. In the above example, the obtained LLR's are accumulated in the memory, for example, in the form of positive/negative real numbers in order of the respective four bits.

Figure 11:
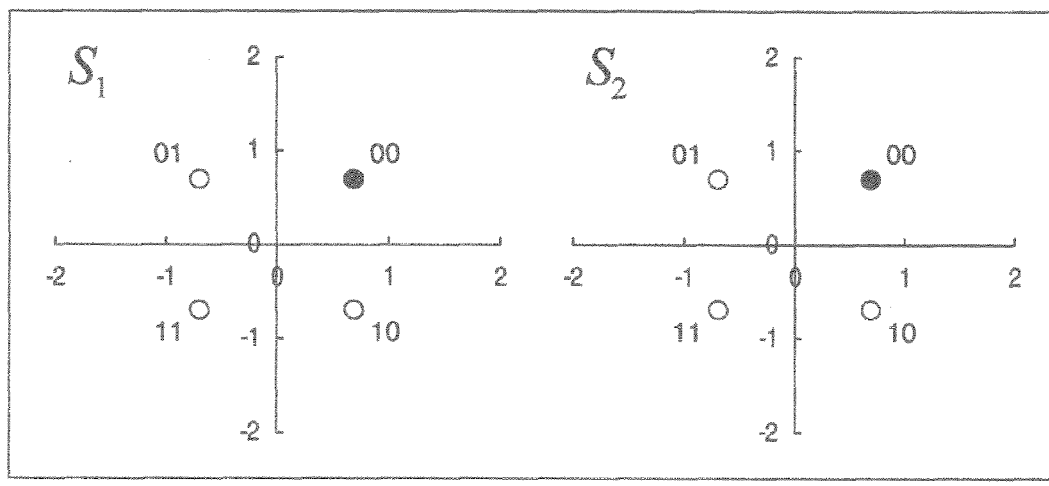
FIG. 11 is a diagram illustrating an example of constellation of QPSK transmission of 2×2 MIMO.
Figure 12:
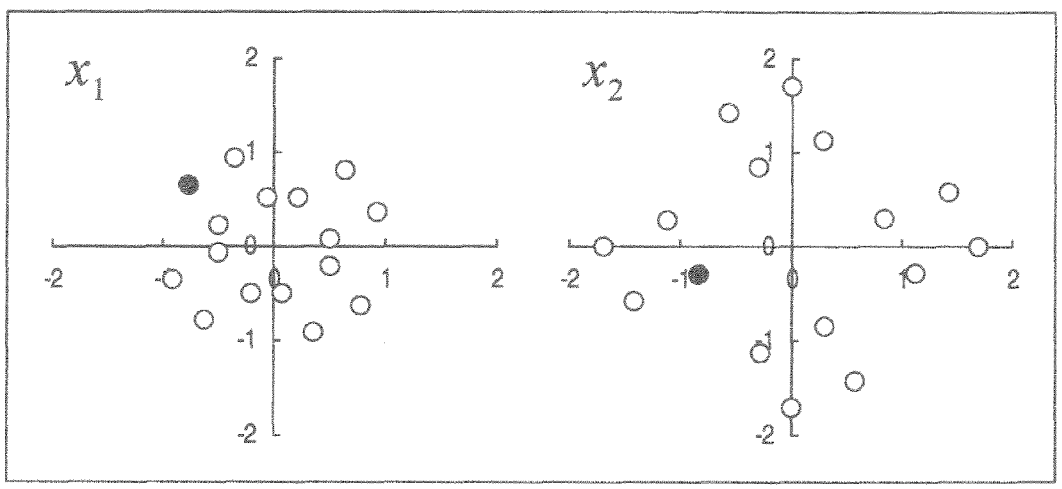
FIG. 12 is a diagram illustrating an example of QPSK reception signal of 2×2 MIMO.
Figure 13:
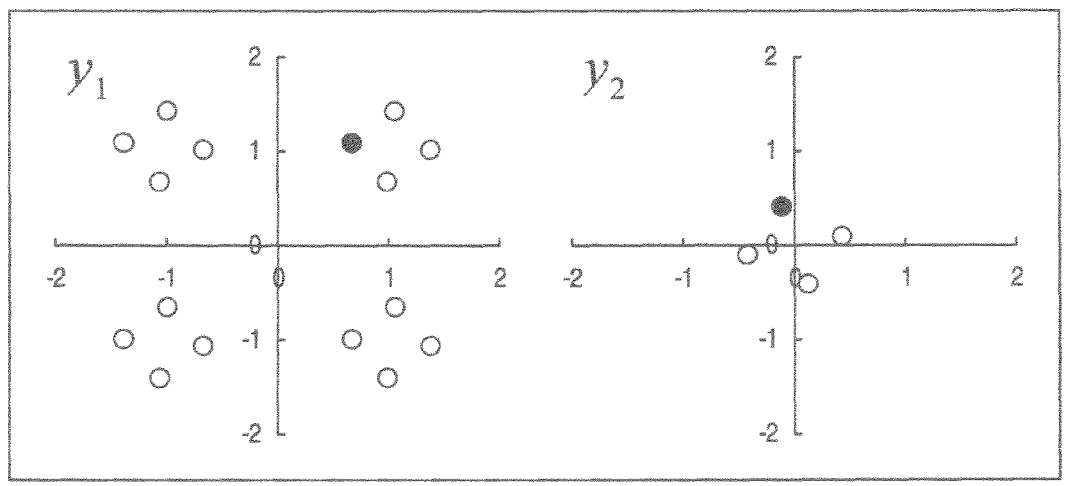
FIG. 13 is a diagram illustrating an example of reception signal after QR decomposition of 2×2 MIMO.
Figure 14:
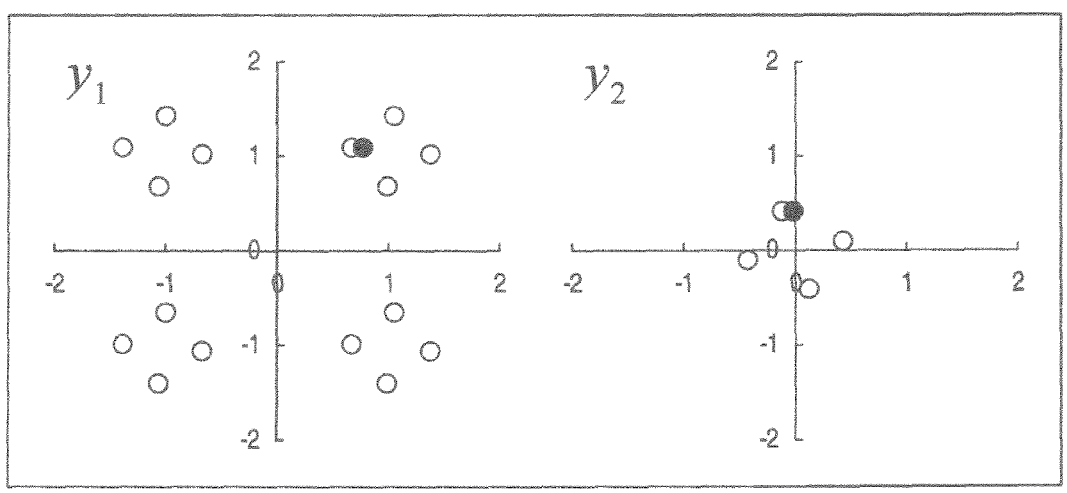
FIG. 14 is a diagram illustrating an example of presumed reception dot and actual reception dot.
Figure 15:
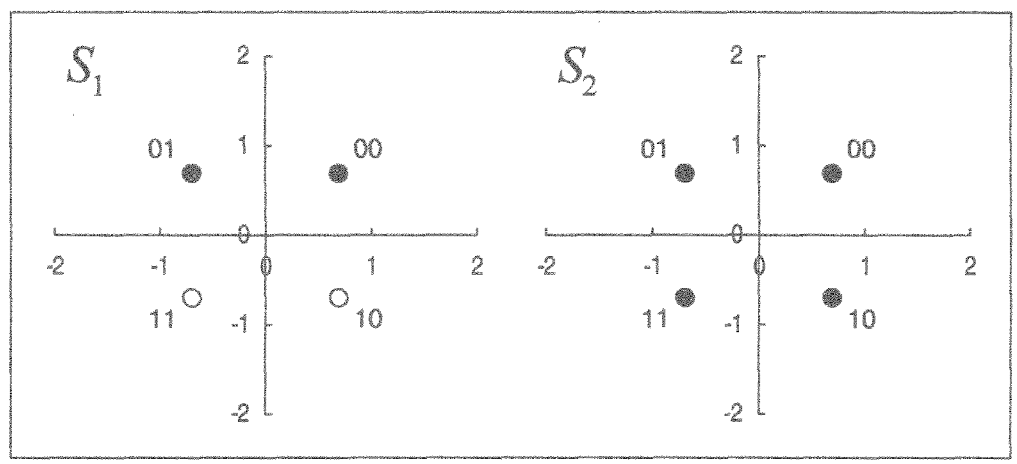
FIG. 15 is a diagram illustrating an example of constellation when s1 is 0x.
Figure 16:
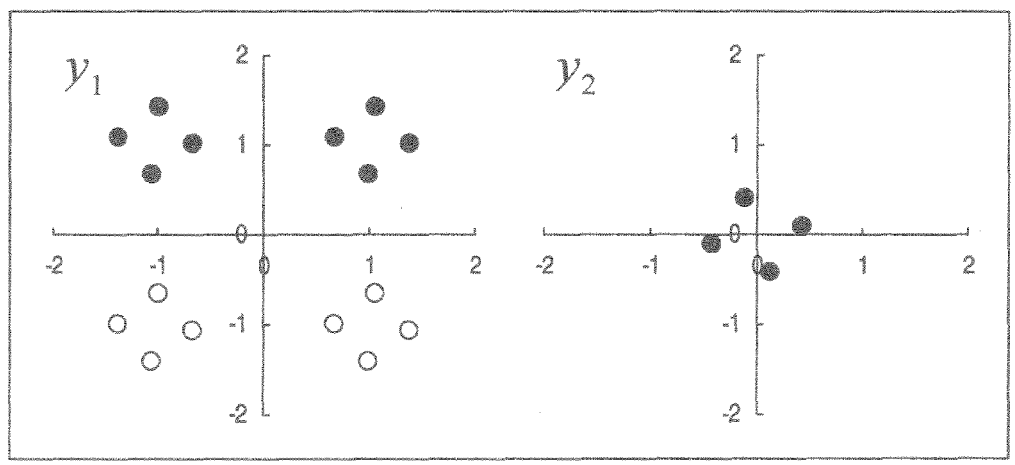
FIG. 16 is a diagram illustrating an example of reception signal when s1 is 0x.
Figure 17:
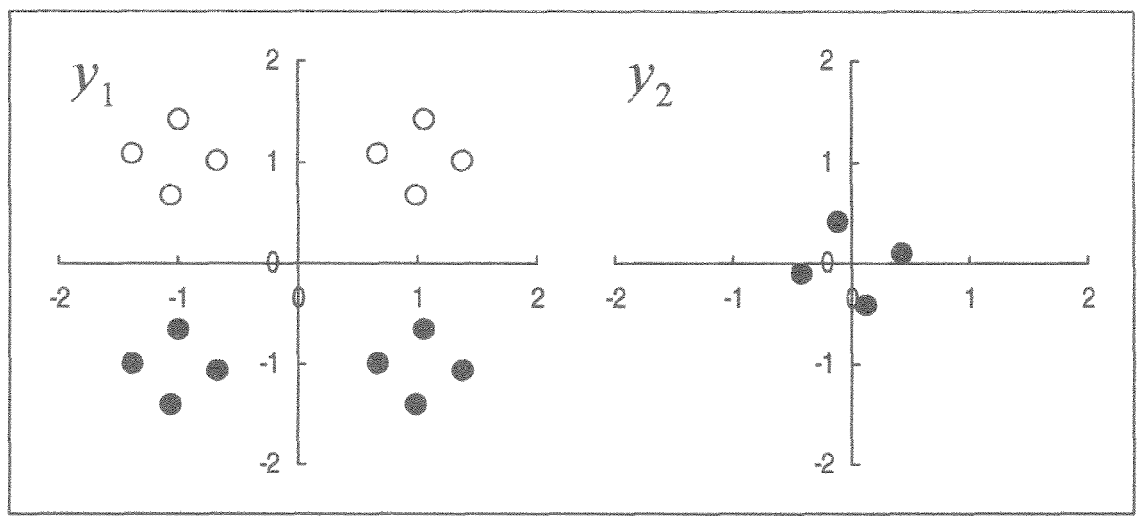
FIG. 17 is a diagram illustrating an example of constellation when s1 is 1x.
Figure 18:
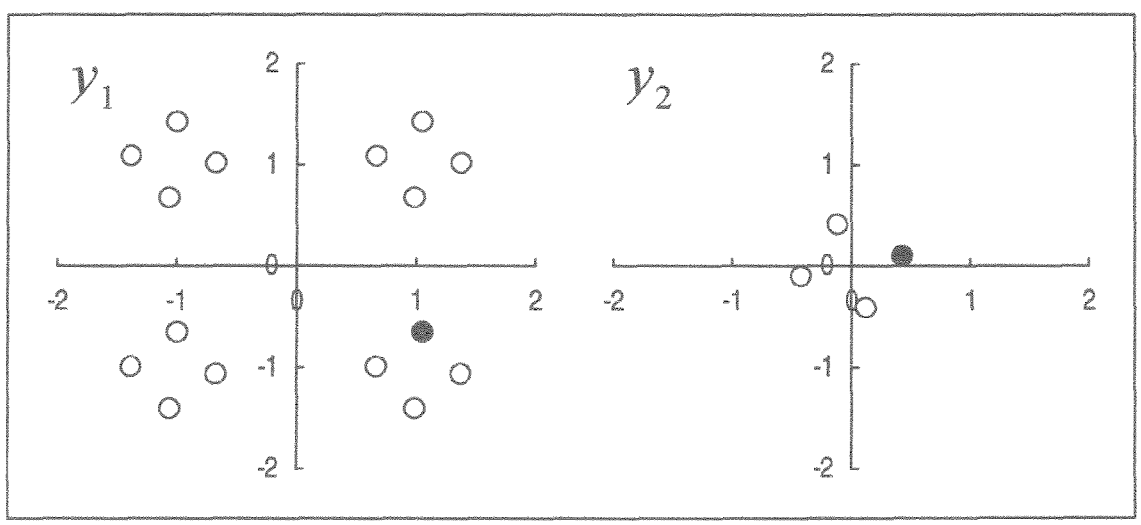
FIG. 18 is a diagram illustrating an example of reception signal when s1 is 1x.

The above explanation will be complemented by taking one specified example by making reference to FIGS. 11 to 18, with FIG. 11 being a diagram illustrating an example of constellation of QPSK transmission of 2×2 MIMO, FIG. 12 being a diagram illustrating an example of QPSK reception signal of 2×2 MIMO, FIG. 13 being a diagram illustrating an example of reception signal after QR decomposition of 2×2 MIMO, FIG. 14 being a diagram illustrating an example of presumed reception dots and actual reception dots, FIG. 15 being a diagram illustrating an example of constellation when s1 is 0x, FIG. 16 being a diagram illustrating an example of reception signal when s1 is 0x. FIG. 17 being a diagram illustrating an example of constellation when s1 is 1x, and FIG. 18 being a diagram illustrating an example of reception signal when s1 is 1x.

The transmission code is assumed to be as shown in FIG. 5. More specifically, (s1,s2)=("00", "00") is assumed to be transmitted. On plane, information of s1=(0.70, 0.70) and s2=(0.70, 0.70) is assumed to be transmitted (as shown at black dots in FIG. 11). Reception signals are multiplied by propagation paths, respectively, and so synthesized as to be x1=(−0.77, 0.63) and x2=(−0.84, −0.28) (as shown at black dots in FIG. 12). At reception dots after QR decomposition, y1=(0.67, 1.06) and y2=(−0.11, 0.43) stand (as shown at black dots in FIG. 13). Actually, however, reception signals are added with noise and so, drifted from the black dots in FIG. 13, leading to y1=(0.77, 1.06) and y2=(−0.01, 0.43) (as shown at black dots in FIG. 14 when the noise associated with both the antennas is assumed to be (0.1, 0.0)). In that case, P0 is considered for the first bit of S1. Assuming that (s1, s2)= ("0x, xx"), x being arbitrary, is transmitted, 2 combinations are considered for s1 and 4 combinations are considered for s4, 8 combinations in total, in the P0 as shown in FIG. 15. By multiplying propagation paths, thus preparing a replica and by performing QR decomposition, 8 replicas and 4 replicas are made up for y1 and y2, respectively, as shown in FIG. 16. By using these replicas, the metrics from the reception dots (black dots in FIG. 14) are calculated. In the present example, the replica corresponding to transmission of (s1, s2)=("00", "00") has the minimal metric value. In the MAX log MAP approximation, only the most closely distant replica is considered and accordingly, P0 is given by expression (9).

$$P0 = \exp\{-L(R_1, R_2)\} \quad (9)$$
$$= \exp\left\{-\frac{|0.1|^2}{|\tilde{n}_1|^2} - \frac{|0.1|^2}{|\tilde{n}_2|^2}\right\}$$

Similarly, P1 is calculated. For y1 and y2 indicated by black dots in FIG. 17, 8 replicas and 4 replicas are made up, respectively.

By using these replicas, the metric values from the reception dots (black dots in FIG. 14) are calculated. In the present example, replicas y1=(1.06, −0.67) and y2=(0.43, 0.11) corresponding to transmission of assumptive (s1, s2)=("10", "10") have each the minimally close distance (black dots in FIG. 18). In the MAX log MAP approximation, only the most closely distant replica is considered and accordingly, P1 is expressed by expression (10).

$$P1 = \exp\{-L(R_1, R_2)\} \quad (10)$$
$$= \exp\left\{-\frac{(1.06-0.77)^2 + (-0.67-1.06)^2}{|\tilde{n}_1|^2}\right\} \times$$
$$\exp\left\{-\frac{(0.43+0.01)^2 + (0.11-0.43)^2}{|\tilde{n}_2|^2}\right\}$$
$$= \exp\left\{-\frac{3.09}{|\tilde{n}_1|^2} - \frac{1.25}{|\tilde{n}_2|^2}\right\}$$

The LLR is given by expression (11).

$$\log\{P0/P1\} = -\frac{0.01}{|\tilde{n}_1|^2} - \frac{0.01}{|\tilde{n}_2|^2} - \left\{-\frac{3.09}{|\tilde{n}_1|^2} - \frac{1.25}{|\tilde{n}_2|^2}\right\} \quad (11)$$

(Step 307)

The program proceeds to step 307 in FIG. 3, in this step, processing concerning all symbols is checked for its completion. In case the processing concerning all symbols has not ended yet, the program proceeds to step 308 to update the objective symbols and then returns to the step 301. When the processing concerning all symbols has ended, the LLR's accumulated in the memory in the step 306 are transferred to the decoder 116 representing a block for carrying out the next process, thus ending the present process.

(MMSE)

Next, of the MMSE will be explained with reference to FIG. 4.

(Step 401)

In FIG. 4, firstly, a reception signal series including a plurality of symbols is decomposed to individual symbols. The explanation given in connection with the step 301 is equally applied to the process in the step 401.

In 2×2 MIMO (in the case of QPSK), different pieces of information are transmitted simultaneously from the two antennas and accordingly, information of one symbol includes two codes consisting of two constellations of S1 and S2 as exemplified in FIG. 5.

The transmitted individual codes (signals) propagate through propagation paths (for example, as shown in FIG. 6) and then, the two transmission codes (signals) are synthesized and received by the reception antennas. In FIG. 6, the response of each of the propagation paths is indicated by a vector connecting the origin and ●. Since the reception signals are weighted by the propagation paths and thereafter synthesized, they are received in the form of signal dots as shown in FIG. 7. The two antennas receive the signals having propagated through the 4 propagation paths independent of one another. Consequently, two kinds of constellations each having 16 candidate dots can be obtained and by solving equations therefor, the signals are received in a manner of presuming the transmission signals.

(Step 402)

In the MMSE, for the purpose of solving the equation, the reception signal x is multiplied by the weight of MMSE to estimate the original code dots.

$$Y = \begin{bmatrix} y_1 \\ y_2 \end{bmatrix} = W^H X \quad (12)$$
$$= \begin{bmatrix} w_{11} & w_{12} \\ w_{21} & w_{22} \end{bmatrix} \begin{bmatrix} x_1 \\ x_2 \end{bmatrix}$$
$$= \begin{bmatrix} w_{11} & w_{12} \\ w_{21} & w_{22} \end{bmatrix} \begin{bmatrix} h_{11} & h_{12} \\ h_{21} & h_{22} \end{bmatrix} \begin{bmatrix} s_1 \\ s_2 \end{bmatrix} +$$
$$\begin{bmatrix} w_{11} & w_{12} \\ w_{21} & w_{22} \end{bmatrix} \begin{bmatrix} n_1 \\ n_2 \end{bmatrix}$$
$$= RS + \tilde{N}$$

where W represents the weight of MMSE.

The weight W is expressed by $$W^H = H^H(HH^H + |N|^2)^{-1} \quad (13)$$
$$= \begin{bmatrix} h_{11}^* & h_{21}^* \\ h_{12}^* & h_{22}^* \end{bmatrix} \left( \begin{bmatrix} h_{11} & h_{12} \\ h_{21} & h_{22} \end{bmatrix} \begin{bmatrix} h_{11}^* & h_{21}^* \\ h_{12}^* & h_{22}^* \end{bmatrix} + \begin{bmatrix} \sigma_1 & 0 \\ 0 & \sigma_2 \end{bmatrix} \right)^{-1}$$

Then, R and N in expression (12) are given by expressions (14) and (15), respectively.

$$R = W^H H = \begin{bmatrix} r_{11} & r_{12} \\ r_{21} & r_{22} \end{bmatrix} \quad (14)$$

$$\tilde{N} = W^H N = \begin{bmatrix} \tilde{n}_1 \\ \tilde{n}_2 \end{bmatrix} \quad (15)$$

(Step 403)

The program proceeds to step 403 in FIG. 4. In this step, in connection with s1, expression (16) is obtained from expression (12).

$$y_1 = r_{11}s_1 + \tilde{n}_1 \quad (6)$$

In this expression, the term concerning s2 is eliminated. By assuming a candidate R1 for s1 (in the case of QPSK, R1 is any one of ⌈00⌋, ⌈01⌋, ⌈11⌋, ⌈10⌋ of s1 shown in FIG. 5), the metric is expressed by expression (17).

$$L(R_1) = \frac{|r_{11}R_1 - y_1|^2}{|\tilde{n}_1|^2} \quad (17)$$

This expression is calculated in respect of all candidates for R1.

Similarly, in connection with s2, expression (18) is obtained from expression (12).

$$y_2 = r_{22}s_2 + \tilde{n}_2 \quad (18)$$

In this expression, the term concerning s1 is eliminated. By assuming a candidate R2 for S2 (in the case of QPSK, R2 is any one of ⌈00⌋, ⌈01⌋, ⌈11⌋, ⌈10⌋ of s1 shown in FIG. 5), the metric is expressed by expression (19).

$$L(R_2) = \frac{|r_{22}R_2 - y_2|^2}{|\tilde{n}_2|^2} \quad (19)$$

This expression is calculated in respect of all candidates for R2.

From the thus obtained metric, the log likelihood ratio (LLR) is calculated. In the example of FIG. 5, since QPSK symbols each capable of transmitting information of 2 bits are transmitted from the two antennas simultaneously, information of 4 bits in total can be transmitted at a time. A log likelihood for each bit is determined through the following procedures. More particularly, each of the 4 bits is noticed and probability P0 when the transmitter is assumed to transmit 0 is calculated. Also, probability P1 is calculated when the transmitter is assumed to transmit 1 is calculated. Subsequently, a ratio between these probabilities is taken and logarithmically processed to provide log (P0/P1) which in turn is calculated.

Here, it is meant by noticing each bit that if the transmission information (s1, s2) is decomposed to bit information and is then represented by such 4 bits as ((b0, b1), (b2, b3)), one bit of them is noticed. For example, with only a bit of b0 noticed, probabilities P0 and P1 are calculated by taking all combinations of other bits (b1, b2, b3) being 8 in total into consideration. But, calculating probabilities in respect of all of 8 computations is laborious and accordingly, as a method for reducing the calculation quantity, MAX log MAP approximation has been well known. In this approximation method, in contrast to considering all of the 8 combinations essentially, only a combination of bits in which the metric is minimized are selected and by using the bit combination, probability P0 or P1 is approximated.

On the assumption that the noises comply with the Gaussian distribution, the probability is expressed by exp(-x2). In this expression, a base of x2 corresponds to the metrics calculated so far. Accordingly, the likelihood ratio is advantageous in that not only P0/P1 is merely replaced by the difference log(P0)−log(P1) through logarithmic calculation but also the operation of exponent necessary for calculation of P0 or P1 can be eliminated. In short, if, in noticing a certain bit, the bit is assumed to be 0 or 1, then by making use of the fact that when all combinations of the other bits are considered and a combination for which the metric is minimized is selected and besides, the metric becomes log(P0) or log(P1), the LLR is obtained by calculating the difference between log(P0) and log(P1). The above operation is conducted for all of the 4 bits.

Four LLR's corresponding to the obtained 4 bits are real numbers taking positive and negative values. This means that if a positive value is taken, this gives an index for indicating that information is considered to have higher probability of transmission in 0 and it is meant, therefore, that as the positive value becomes larger, the transmission information being 0 becomes more probable. Conversely, if a negative value is taken, this gives an index for indicating that information is considered to have higher probability of transmission in 1 and it is meant, therefore, that as the negative value becomes smaller, the transmission information being 1 becomes more probable. In the above example, the obtained LLR's are accumulated in the memory, for example, in the form of positive/negative real numbers in order of the respective four bits.

(Step 404)

The program proceeds to step 404 in FIG. 4. In this step, processing concerning all symbols is checked for its completion. In case the processing concerning all symbols has not ended yet, the program proceeds to step 405 to update the objective symbols and then returns to the step 401. When the processing concerning all symbols has ended, the LLR's accumulated in the memory in the step 403 are transferred to the decoder 116 representing a block for carrying out the next process, thus ending the present process.

(Selection of MLD and MMSE)

The present invention is advantageous in that the two receivers of MLD (or QR decomposition-MLD) and MMSE are provided in one apparatus, thereby suppressing the apparatus scale for the MLD and that an expedient is provided which enables the packet reception method to select the usage of the MLD or the MMSE with the help of the control means.

Figure 20:
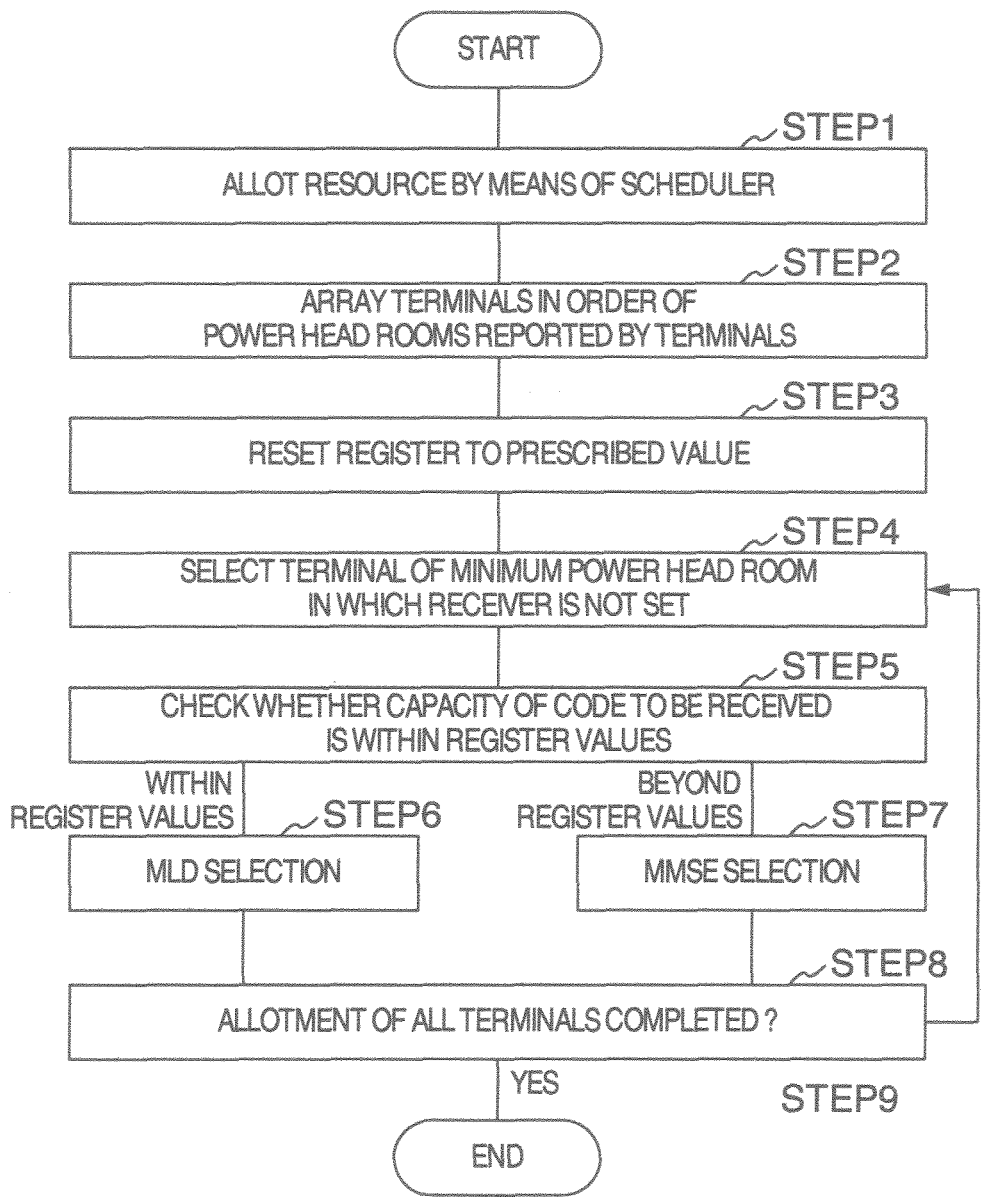
FIG. 20 is a flowchart for explaining a process for selecting MLD and MMSE in the different embodiment of the invention.

Turning now to FIG. 20, a flowchart for explaining a process of selecting the MLD or the MMSE is shown.

The expedient for selecting the two receivers for MLD and MMSE will be described with reference to FIG. 20. A description will be given by taking an instance where the apparatus is a radio base station apparatus and is connected with a plurality of terminal apparatuses.

When the terminal apparatus is about to transmit information to the radio base station apparatus, it transmits a band-wise request (band request) to the radio base station apparatus. The radio base station apparatus incorporates a scheduler and allots to the terminal apparatus having transmitted the band request a frequency resource adapted to permit the use of the terminal apparatus. The radio base station uses a down circuit to transmit, to the terminal apparatus in question, frequency resource allotment information (MAP) for permitting usage (step 1). Included in the MAP are pieces of information concerning the position and size of the frequency resource the terminal apparatus is about to use and concerning a MCS (Modulation Code Scheme). The terminal apparatus operates in accordance with the allotment information reported through the down circuit. Further, the radio base station apparatus is grasping conditions of old communication with a plurality of terminal apparatuses. In the communication conditions, power information the terminal apparatus transmits is also included. For the terminal apparatus, the maximum transmission power is settled and the difference between transmission power at present and the maximum transmission power is periodically reported as a power head room to the radio base station apparatus.

Figure 21:
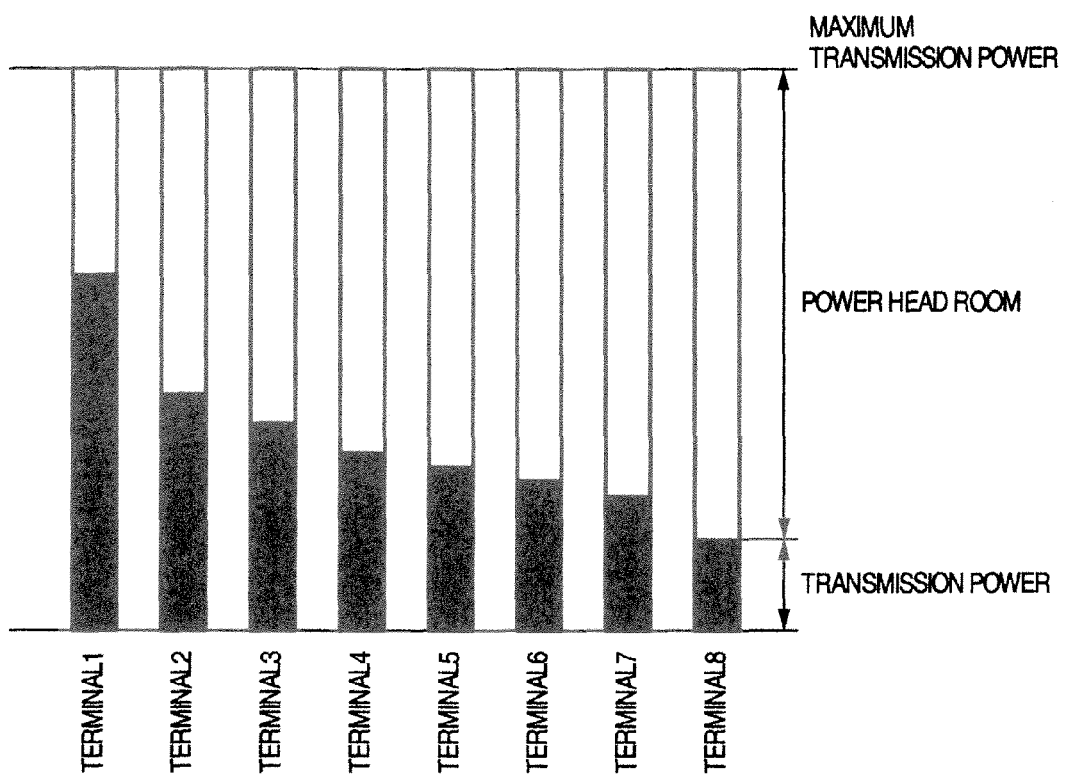
FIG. 21 is a diagram illustrating power head rooms reported from a plurality of terminals.

Turning to FIG. 21, an example of the power head rooms reported to the radio base station apparatus from the plurality of terminal apparatuses is illustrated.

The terminal apparatuses 1 to 8 exhibit power head rooms which become smaller in order of them. Namely, the terminal apparatus 1 has the largest transmission power and is located in a bad environment. The radio base station apparatus consults the reported power head rooms to grasp the statuses of the terminal apparatuses. As a first example, the radio base station apparatus arrays power head rooms of terminal apparatuses reserved for subsequent reception in order of smaller to larger ones (see step 2 in FIG. 20). Generally, in the terminal apparatus associated with bad conditions of propagation path, the transmission power must be delivered in high level. As a result, the power head room has a small value. Accordingly, ranking is possible through rearrangement, in which a terminal apparatus associated with a bad propagation path condition precedes and a terminal apparatus associated with a good propagation path condition succeeds.

Subsequently, the radio base station apparatus operates to grasp amounts of pieces of information capable of undergoing the MLD process. More specifically, the register adapted to record residual amounts of pieces of information capable of being processed within a predetermined period of time is initialized (step 3). The MLD equipments are allotted sequentially, starting from the heading terminal in the rearrangement. More specifically, out of apparatus not yet subjected to allotment, a terminal exhibiting the minimum power head room is selected (step 4) and the terminal is decided as to whether to be able to accept allotment. Whether or not the allotment is possible is judged by considering the aforementioned register. MCS of transmission information from the terminal apparatus about to undergo new allotment and the allotment resource quantity (step 5). For example, in the case of a QPSK/2 antenna MIMO, 16 symbol dots exist and hence, the resource of MLD necessary to conduct the MLD process is multiplied so as to be unit time×16. Further, if the allotted resource is of 16 symbols, a receiver resource of a MLD in unit of 16×16=256 is consumed.

When this resource consumption is determined as possible to be processed in comparison with the residual quantity possible to be processed recorded in the register, the MLD is allotted to the terminal (step 6). Then, the calculated consumable reception resource quantity is subtracted from the register and a new residual quantity left after the allotment and being possible to be processed is left in the register. If the processing is determined as impossible, the MMSE is allotted to the terminal apparatus (step 7). By repeating these steps, the MLD or MMSE allotment process is repeated until the last terminal apparatus in the rearrangement (step 8). In this manner, the MLD receiver can be allotted sequentially, starting from the terminal of bad reception condition, so long as the resource of receiver is permissible.

Embodiment 2

(Selection of MLD, MMSE (with SIC: Successive Interference Canceller) and MMSE (without SIC))

Next, a second embodiment will be described with reference to FIGS. 19 and 22.

Figure 19:
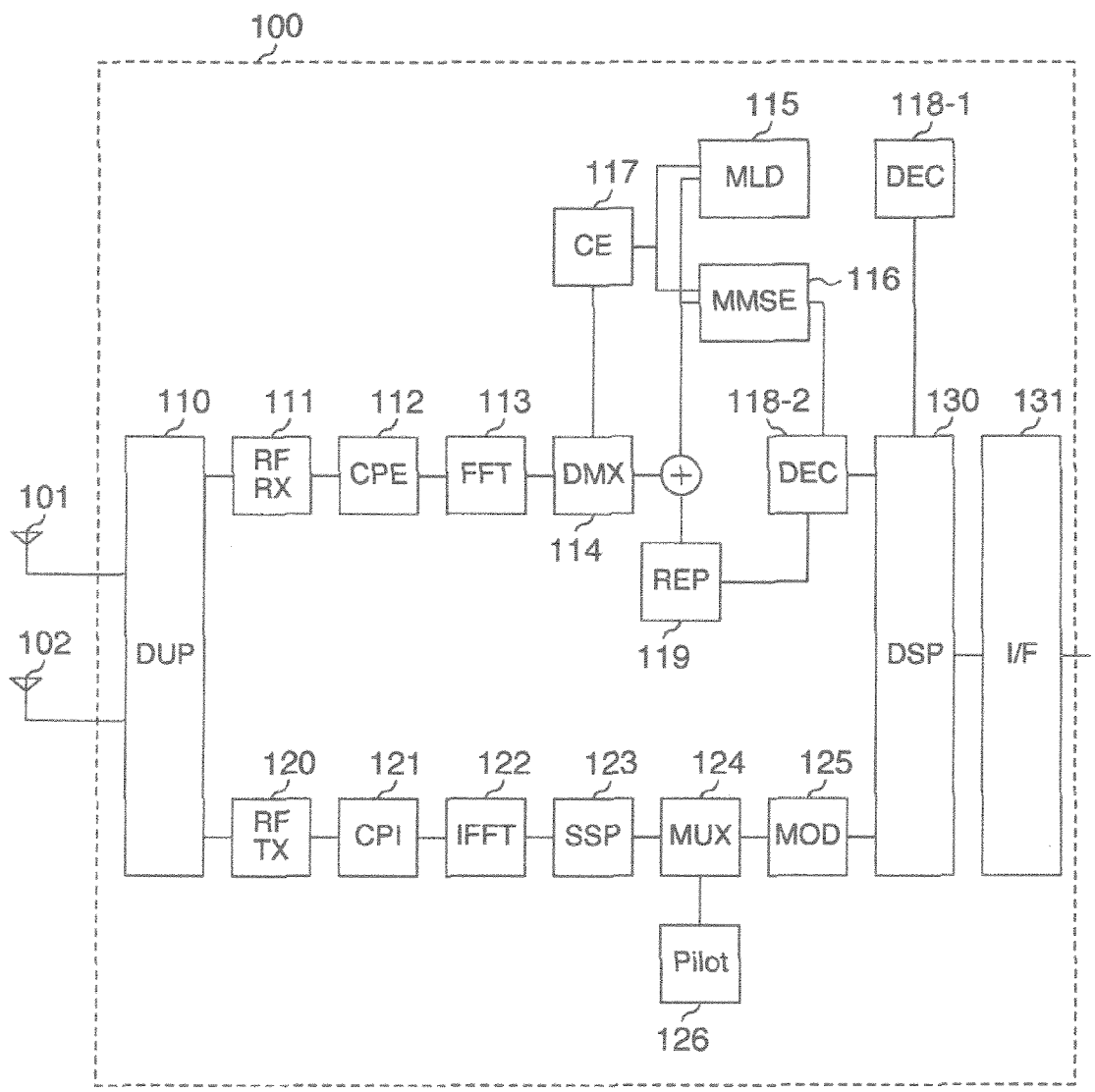
FIG. 19 is a diagram useful to explain the construction of an apparatus according to another embodiment of the invention.

FIG. 19 is useful to explain the construction of an apparatus according to the second embodiment.

Figure 22:
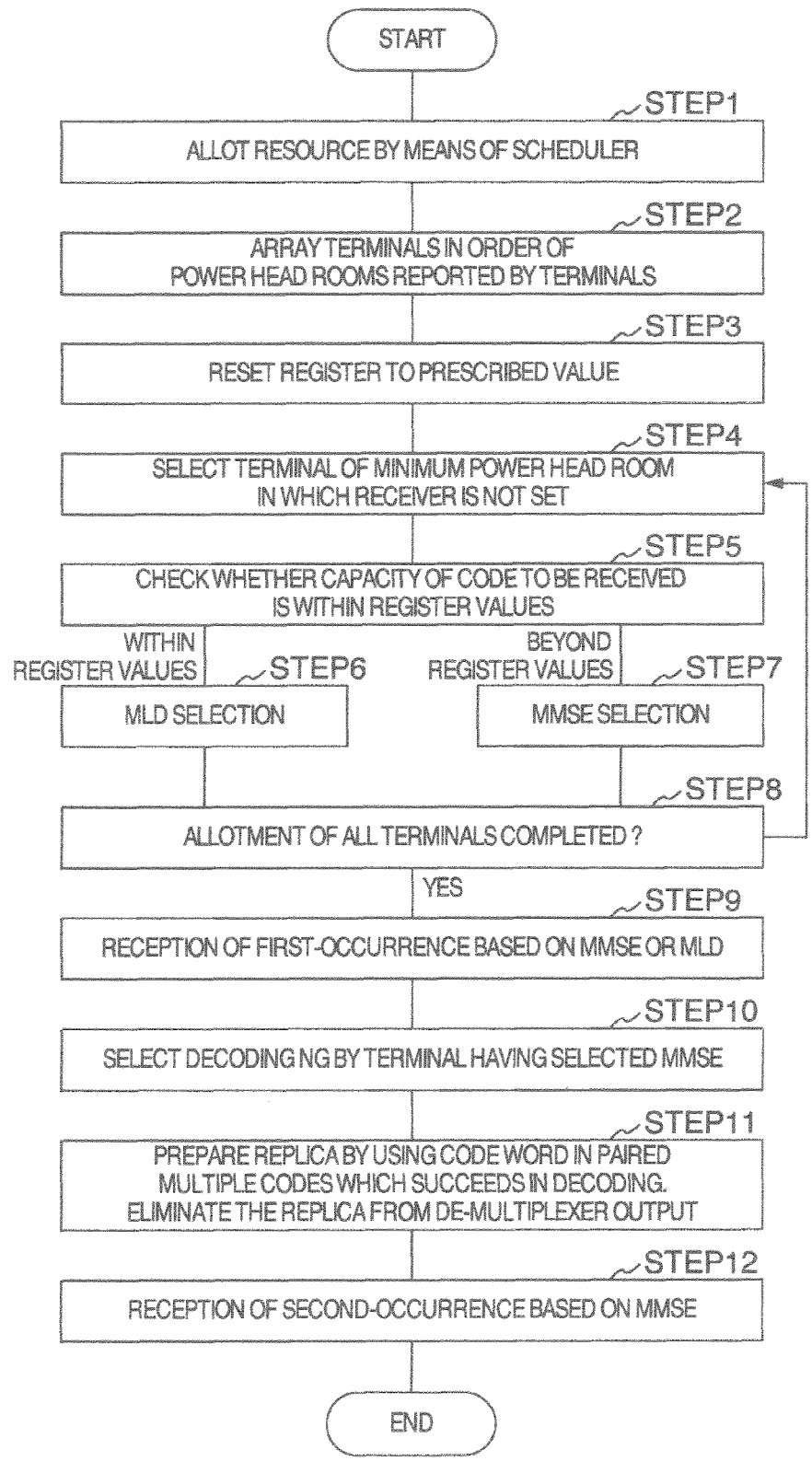
FIG. 22 is a flowchart useful to explain a process for selecting MLD and MMSE and MMSE-SIC as well.

Illustrated in FIG. 22 is a flowchart for explaining a process of selecting MLD or MMSE (with SIC, without SIC) in the second embodiment.

In the first embodiment, the hybrid receiver of MLD and MMSE has been disclosed, whereas in the second embodiment, two receivers of MLD (or QR decomposition-MLD and MMSE-SIC are particularly provided in one apparatus to suppress the scale of MLD equipment and besides, a scheme is particularly provided which permits the packet reception method to select the use of MLD, the use of MMSE (with SIC) or the use of MMSE (without SIC) by means of control means.

The scheme for selecting the MLD, MMSE (with SIC) or MMSE (without SIC) be described herein by making reference to FIG. 22. Steps up to step 8 are the same as those described in connection with embodiment 1. A description will be given by taking an instance where the apparatus is a radio base station apparatus connected with a plurality of terminal apparatuses, for example. When the terminal apparatus is about to transmit information to the radio base station apparatus, it transmits a band-wise request (band request) to the radio base station apparatus. The radio base station apparatus incorporates a scheduler and allots to the terminal apparatus having transmitted the band request a frequency resource adapted to permit the use of the terminal apparatus. The radio base station uses a down circuit, to transmit to the terminal apparatus in question, frequency resource allotment information (MAP) for permitting usage. Included in the MAP are pieces of information concerning the position and size of the frequency resource the terminal apparatus is about to use and concerning a MCS (encoding method). The terminal apparatus operates in accordance with the allotment information reported through the down circuit.

Further, the radio base station apparatus is grasping conditions of old communication with a plurality of terminal apparatuses. In the communication conditions, power information the terminal apparatus transmits is also included. For the terminal apparatus, the maximum transmission power is settled and the difference between transmission power at present and the maximum transmission power is periodically reported as a power head room to the radio base station apparatus. The radio base station apparatus consults the reported power head room to grasp the statuses of the terminal apparatuses. As a second example, the radio base station apparatus arrays power head rooms of terminal apparatuses reserved for subsequent reception in order of smaller to larger ones. Generally, in the terminal apparatus associated with bad conditions of propagation path, the transmission power must be delivered in high level. As a result, the power head room has a small value. Accordingly, ranking is possible through the rearrangement, in which a terminal apparatus associated with a bad propagation path condition precedes and a terminal apparatus associated with a good propagation path condition succeeds.

Subsequently, the radio base station apparatus operates to grasp amounts of pieces of information capable of undergoing the MLD process. More specifically, the register adapted to record residual amounts of pieces of information capable of being processed within a predetermined period of time is initialized. The MLD equipments are allotted sequentially, starting from the heading terminal in the rearrangement. Whether or not the allotment is possible is judged by considering the aforementioned register, MCS of transmission information from the terminal apparatus about to undergo new allotment and the allotment resource quantity. For example, in the case of a QPSK/2 antenna MIMO, 16 symbol dots exist and hence, the resource of MLD necessary to conduct the MLD process is multiplied so as to be unit time×16. Further, if the allotted resource is of 16 symbols, a receiver resource of a MLD in unit of 16×16 256 is consumed.

When this resource consumption is determined as possible to be processed in comparison with the residual quantity possible to be processed recorded in the register, the MLD is allotted to the terminal. Then, the calculated consumable reception resource quantity is subtracted from the register and a new residual quantity left after the allotment and being possible to be processed is left in the register. If the processing is determined as impossible, the MMSE is allotted to the terminal apparatus. By repeating these steps, the MLD or MMSE allotment process is repeated until the last terminal apparatus in the rearrangement. In this manner, the MLD receivers can be allotted sequentially, starting from the terminal of bad reception condition, so long as the resource of receiver is permissible. Next, whether or not the SIC of MMSE is to be used is judged. The SIC is effective, especially during multi-code transmission such as MU-MIMO. After the judgment of MLD, it is decided whether the SIC is to be applied to a packet for which the MMSE receiver is scheduled for usage. Since the SIC is effective especially during MIMO reception of multi-code, it is decided whether the resource allotted by the scheduler is a multi-code word. The SIC is not applied to any signal being not a multi-code. Out of multi-code word signals, signals are investigated sequentially, starting from a terminal apparatus exhibiting small transmission power of the terminal apparatuses rearranged in order of transmission power as shown in FIG. 21 (in order inverse to that of MLD decision).

The SIC is passed many times through the MMSE and decoder and so, all of the received reception signals can be processed with minimal time consumption and can be judged by a margin of processing quantity on the SIC. Firstly, in respect of all code words, the first-occurrence decoding process is carried out (step 9). Since the SIC is carried out in this manner, any codes which miss processing can be eliminated.

Subsequently, to a code word failing to be received in the first reception (step 10), the same resource (in time×frequency) as that of the code word is allotted and inter-signal interferences are eliminated sequentially, starting from a code word exhibiting small transmission power (or large presumed SINR) (step 11).

The code word removed of the inter-signal interference and improved in quality is again subjected to the MMSE process and decoding process. Because of elimination of interference, the probability of succeeding in reception becomes very high in the second-occurrence signal processing (step 12).

By making reference to FIG. 19, the signal processing in the apparatus according to the second embodiment will be described. A code word decomposed in the demultiplexer 114 is inputted to either the MLD (115) or the MMSE (116) under the command of the DSP (130). The signal inputted to the MMSE (116) is applied with decoding processing (118). A code word having failed to be decoded, if a code word to be paired succeeds in decoding, forms a replica from the successful signal and an output of the propagation path presumption (117). By causing the demultiplexer (114) to again output the same code word so as to eliminate the replica having succeeded in reception, a signal removed of influence of the interference can be formed. The signal removed of the interference is again inputted to the MMSE (116) and to the decode (118-2). In this scheme, when the reception is successful, information is transmitted to the DSP (130).

In the present embodiment, a description has been given to the example of a method for selecting the receiver by using the power level and the presumed SINR. It should be understood that the essence of the present invention resides in that a terminal apparatus has a plurality of reception methods and the plural reception methods are selected in accordance with the environment of the to terminal apparatus. It is within the scope of the present invention that on the basis of either report information from the terminal apparatus or results of the measurement of environment judgment the base station apparatus can execute or of a plurality of measured values, the method for reception of signals from the terminal apparatus is changed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication apparatus having a plurality of antennas to transmit signals in the form of multi-input and multi-output (MIMO), comprising:
 a reception signal processing unit adapted to process signals received from said plurality of antennas;
 a transmission signal processing unit adapted to process signals to be transmitted from said plurality of antennas;
 a control unit for controlling the entire apparatus; and
 a register for storing a transmission/reception signal processing program and an amount of transmission/reception signal processing,
 wherein
  said reception signal processing unit is configured to operate correspondingly to a plurality of kinds of reception signal processing schemes, and
  said control unit is configured to allot, with respect to a plurality of radio communication apparatus opposing through propagation paths, a first reception signal processing scheme for a bad propagation path condition in accordance with a ranking made using information on transmission power from each of the radio communication apparatus by determining conditions between each of the radio communication apparatus and the propagation paths, to store an amount of processing for the transmission/reception signal processing, and, in accordance with conditions of said transmission/reception signal processing unit, to allot another reception signal processing scheme than the first reception signal processing scheme in case that the first reception signal processing scheme is determined to be impossible for data processing;
 the first reception signal processing scheme is a maximum likelihood detection (MLD) method, and the another reception signal processing scheme is one of methods selected from a group including a minimum mean square error (MMSE) method and an MMSE-SIC (Successive Interference Canceller) with interference cancellation function; and
 wherein the MMSE-SIC is allotted as a reception signal processing method in the case of multi-code transmission.

2. A radio communication apparatus according to claim 1, wherein
 the first reception signal processing scheme is a maximum likelihood detection (MLD) method and the another reception signal processing scheme is a minimum mean square error (MMSE) method.

3. A radio signal processing method for use in a radio communication apparatus having a plurality of antennas to transmit signals in the form of multi-input and multi-output (MIMO), the method comprising:
- allotting, with respect to a plurality of radio communication apparatus opposing through propagation paths, a first reception signal processing scheme for a bad propagation path condition in accordance with a ranking made using information on transmission power from each of the radio communication apparatus by determining conditions between each of the radio communication apparatus and the propagation paths;
- storing an amount of processing for the transmission/reception signal processing; and,
- allotting another reception signal processing scheme than the first reception signal processing scheme in case that the first reception signal processing scheme is determined to be impossible for data processing, in accordance with conditions between each of the radio communication apparatus and the propagation paths;
- wherein the first reception signal processing scheme is a maximum likelihood detection (MLD) method, and the another reception signal processing scheme is one of methods selected from a group including a minimum mean square error (MMSE) method and an MMSE-SIC (Successive Interference Canceller) with interference cancellation function;
- and the MMSE-SIC is allotted as a reception signal processing method in the case of multi-code transmission.

4. A radio signal processing method according to claim 3, wherein
- the first reception signal processing scheme is a maximum likelihood detection (MLD) method and the another reception signal processing scheme is a minimum mean square error (MMSE) method
- a plurality of opposing radio communication apparatuses are present; and.

5. A radio communication apparatus according to claim 1, wherein the bad propagation path condition comprises a small power headroom relative to other power headrooms.

6. A radio signal processing method according to claim 3, wherein the bad propagation path condition comprises a small power headroom relative to other power headrooms.

* * * * *